United States Patent [19]
Bianchetta et al.

[11] 3,862,645
[45] Jan. 28, 1975

[54] PILOT CONTROL VALVE

[75] Inventors: Donald L. Bianchetta, Coal City; Kenneth R. Lohbauer, Joliet, both of Ill.

[73] Assignee: Caterpillar Tractor Co., Peoria, Ill.

[22] Filed: June 18, 1973

[21] Appl. No.: 370,820

Related U.S. Application Data
[62] Division of Ser. No. 237,255, March 23, 1972, Pat. No. 3,771,564.

[52] U.S. Cl...... 137/625.69, 137/625.3, 137/625.68
[51] Int. Cl............................................ F15b 13/04
[58] Field of Search....... 137/625.3, 625.68, 625.69; 251/121, 205, 206, 324, 325

[56] References Cited
UNITED STATES PATENTS

| | | | |
|---|---|---|---|
| 2,631,571 | 3/1953 | Parker | 137/625.68 |
| 2,836,198 | 5/1958 | McNeill | 251/335 X |
| 3,049,147 | 8/1962 | Neilson | 137/625.69 |
| 3,067,979 | 12/1962 | Cox | 251/334 X |
| 3,123,335 | 3/1964 | Darling | 251/335 X |
| 3,263,574 | 8/1966 | Tennis | 137/625.69 X |
| 3,477,225 | 11/1969 | Cryder et al. | 60/444 X |
| 3,486,418 | 12/1969 | Cryder et al. | 91/413 X |
| 3,556,155 | 1/1971 | McWilliams et al. | 137/625.3 X |
| 3,589,401 | 6/1971 | Harding | 251/324 X |
| 3,667,504 | 6/1972 | Wittren et al. | 137/625.69 |

FOREIGN PATENTS OR APPLICATIONS

| | | | |
|---|---|---|---|
| 1,187,084 | 2/1965 | Germany | 137/625.69 |

Primary Examiner—William R. Cline
Assistant Examiner—Gerald A. Michalsky
Attorney, Agent, or Firm—Phillips, Moore, Weissenberger Lempio & Strabala

[57] ABSTRACT

There is disclosed a pilot valve for operation of a main control valve wherein the pilot valve is provided with throttling means to modulate the control fluid to effect an accelerated actuation of the main control valve at each end of the modulation range of the main valve and to provide an extended modulation range for effective and precise control of the main control valve by the operator.

6 Claims, 3 Drawing Figures

PILOT CONTROL VALVE

This is a continuation, division, of Ser. No. 237,255, Filed Mar. 23, 1972 now U.S. Pat. No. 3,771,564.

BACKGROUND OF THE INVENTION

The present invention relates to valves and pertains more particularly to a modulating pilot valve.

The use of pilot valves for the control or operation of main control valves has been known for some time. Among the advantages of pilot controls is that it permits remote location of operator stations as well as a reduction of operator effort in the actuation of control valves. Remote control can be inexpensively and advantageously accomplished by pilot control because of the low volumes and pressures required of a pilot system.

Operator effort may also be considerably reduced for these same reasons. It is obvious, for example, that hydraulically-operated machines requiring very high volumes and pressures of fluid require the use of very large control valves which may require considerable force to move, and at the same time must necessarily undergo considerable movement in order to achieve its control function. These factors render pilot control especially desirable in the control system of hydraulically powered machines. This is especially so in machines requiring high pressures and high volumes for operation of the machine. Examples of such machines requiring high volumes and pressures are loaders, excavators and hydraulic cranes.

Hydraulic excavators are particularly in need of effective pilot control of the hydraulic system. This need is especially acute because of the extremely high pressures and high volumes of fluid normally used or required to operate this system. Pilot control is especially desirable in such implements because of the tremendous expense involved in placing control valves in the near vicinity of the operator compartment to permit operation by typical linkage systems. Such a placement of the control valves would require very expensive conduits and fittings and complex arrangements of the conduit systems.

Pilot operation is also desirable in such machines because of the numerous and repetitious control motions which the operator must undergo with normal operation of such machines. Pilot operation can considerably reduce the forces which the operator himself must exert in order to actuate or control the system. This tremendously reduces fatigue and permits the operator to remain alert for a reasonable period of operation of the machine.

Presently known pilot control systems, however, have the disadvantage of not being entirely satisfactory for use in hydraulic excavators. Present known pilot control systems do not give the operator the precise control and feel that is required or desirable for such machines. Because of the very nature of the work which an excavator is expected to perform, it must be capable of going through extensive or very wide ranges of velocities of movement under very wide ranges of power. Many of the functions within these wide ranges must be carried out under precise and accurate control of the operator in order that the machine may be used safely and efficiently. In order to achieve this necessary control, both the pilot valves and the control valves must be designed to provide effective and precisely controllable modulation of the respective fluids.

Numerous valve constructions for modulation of control fluid are known. The prior art is exemplified, for example, in the following patents, all assigned to the assignee of the present invention: U.S. Pat. No. 2,971,536, issued Feb. 14, 1961; U.S. Pat. No. 3,477,225, issued Nov. 11, 1969; U.S. Pat. No. 3,486,418, issued Dec. 30, 1969; and U.S. Pat. No. 3,556,155, issued Jan. 19, 1971. These patents exemplify the prior art approach to modulation control of either a main control valve or a hydraulic motor. The problem, however, differs in each case.

While the techniques for modulated control of hydraulic motors may often be applied to the pilot control of control valves and vice versa, pilot control modulation does have peculiar problems not found in motor control systems. For example, the force required to move a motor will depend on the load imposed thereon, whereas the force required to move the main control valve will normally be dependent upon its position with respect to its center position. Thus, the pilot valve is displaced to position the control valve, whereas the control valve functions to obtain movement of a motor as opposed to a positioning thereof.

Additional problems with pilot control systems are due to the fact that the indirect connection between the actuating lever which the operator manipulates and the main control valve results in a lack of feel for the control of the implement. This lack of feel for the implement control typically results in a jerky and erratic motion of the implement. Thus, operation of the machine is often hazardous and inefficient.

SUMMARY OF THE INVENTION

It is therefore the primary object of the present invention to provide a pilot control valve which overcomes the above described problems of the prior art.

Another object of the present invention is to provide a pilot valve that is operative to provide precise control of a control valve.

A further object of the present invention is to provide a pilot valve having suitable modulating means which is effective to provide precise and accurate control over a main control valve.

Still another object of the present invention is to provide modulating means for a pilot valve which is operative to provide precise increments in control pressure for the actuation of a main control valve.

In accordance with the present invention, a pilot valve for the actuation of a main control valve is provided with suitable throttling means for modulating the control fluid to provide precise increments in control pressure in order to provide complete and accurate control of the positioning of the main control valve.

BRIEF DESCRIPTION OF THE DRAWINGS

The above and other objects and advantages of the present invention will become apparent from the following specification when read in conjunction with the accompanying drawings wherein.

DETAILED DESCRIPTION OF PREFERRED EMBODIMENTS

Figure 1:
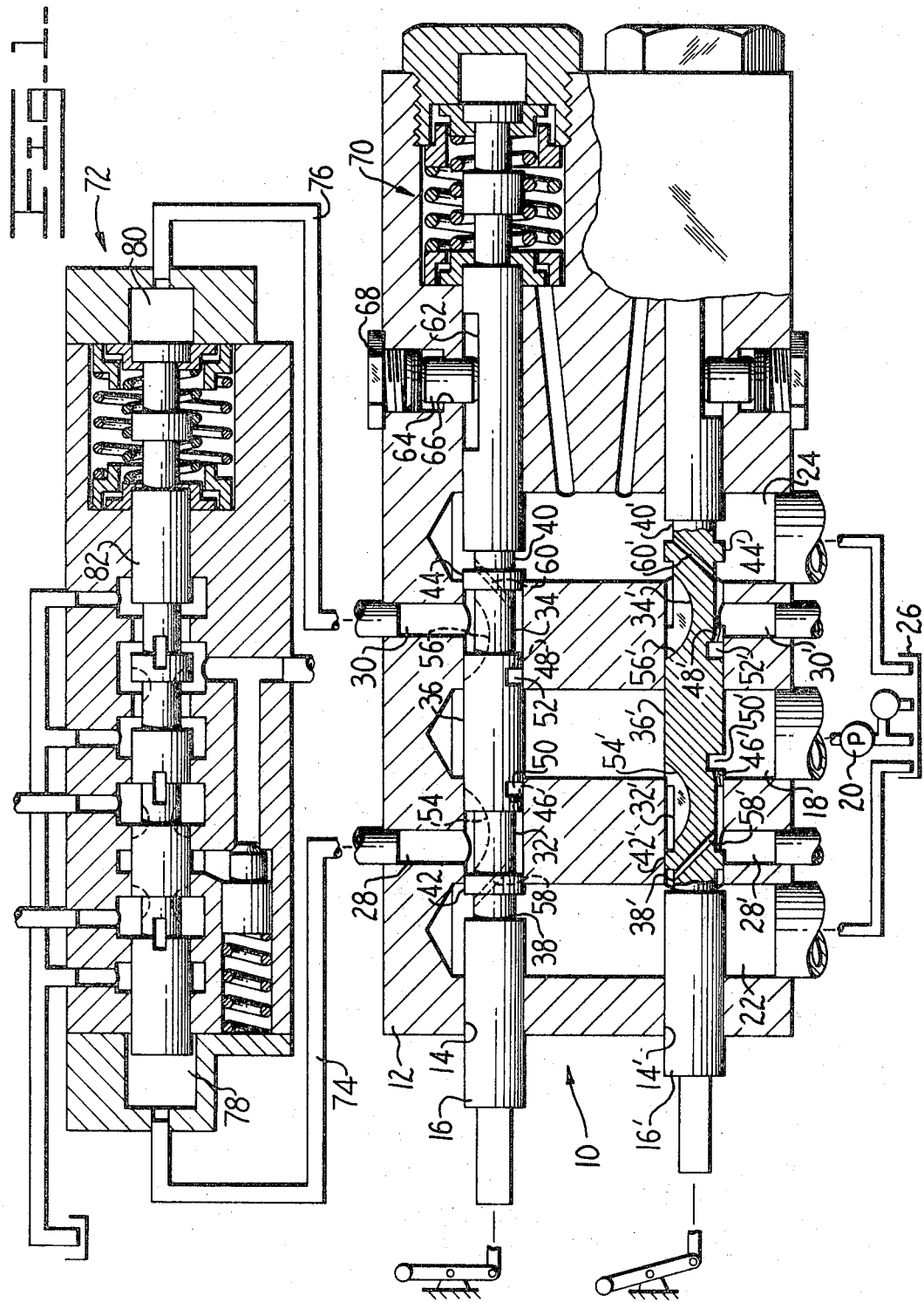
FIG. 1 is a schematic illustration of a pilot control valve incorporating the present invention.

Referring now to the drawings, and particularly to FIG. 1, there is illustrated a preferred embodiment of the present invention incorporated in a pilot valve generally designated by the numeral 10. The illustrated embodiment comprises a housing 12 having a pair of generally parallel cylindrical bores 14 and 14' in which is reciprocally mounted identical control spools 16 and 16'. An inlet passage 18 intersects both bores for supplying pressurized fluid from a pump 20 to be directed by the spools to various outlets. A pair of return passages 22 and 24 positioned to either side of the inlet passage intersect the bores 14 for returning fluid to a sump 26. Pilot control passages 28, 30 and 28' and 30' intersect each of the separate bores for communicating pilot control fluid to a main control valve. Since the two spools are identical, only one will be described in detail, with features of the other identified by the same numeral primed.

Each of the spools 16 is provided with annular grooves 32, 34, thereby forming a central land 36. Another pair of grooves 38 and 40 are formed outwardly of the previously mentioned grooves to thereby form lands 42, 44. These grooves, together with a plurality of orifices, to be described, operate to control the flow of fluid from the inlet to the pilot passages and the return passages. Modulating means in the form of a plurality of metering slots and orifices are provided for modulating the control fluid to achieve a unique stepped or multi-stage actuation of the control valve.

The metering means comprises a first fixed orifice 46 communicating between annular groove 32 and the outer surface or diameter of land 36 and a second fixed metering orifice 48 communicating between the annular groove 34 and with the outer diameter or surface of land 36. Means in the form of cross slots 50 and 52 are provided to render the orifices 46 and 48 instantaneously effective upon movement of the spool to a predetermined position, corresponding with the passage of the edge of the slot into the supply passage. The variable orifice 54 and 56 run parallel to the above described fixed orifices and are in the form of slots extending from the grooves 32, 34 into the central land 36. The grooves or slots 54, 56 are formed such that timing begins immediately after full effectiveness of the fixed orifices 46, 48 so that communications between the inlet 18 and the outlets 28 and 30 become at once a fixed minimum, and from that minimum, a gradual increase to full opening of the pilot valve.

Another pair of metering orifices or passages 58 and 60 are placed in series with the aforementioned metering orifices and communicates between the inside grooves 32, 34 and the outside grooves 38 and 40. These passages provide a pilot drain for the control lines 28 and 30 when the valve 16 is in the neutral position and provides a pressure drop during at least a portion of the time that the inlet orifices provide communication between the inlet 18 and the control passages 28 and 30. These passages 58 and 60 are effective when the outer grooves 38 and 40 are in communication with the outlet passages 22 and 24, but become immediately ineffective as soon as either of these grooves is cut off by movement thereof outside the exhaust passage.

Because of the critical alignment necessary for the orifices and passages of the pilot spool 16, suitable means to prevent rotation of the spool is provided. This means to prevent rotation of the spool comprise a flat 62 formed in the spool 16, against which is positioned a dowel pin 64 retained in a bore 66 such as by plug or screw 68.

Suitable centering means 70 is provided for the spool and may be of any conventional form known in the art, but preferably as illustrated. The centering means, however, must be properly timed so as to cooperate with other timing functions of the valve to contribute to the achievement of novel results sought herein. For example, in the preferred arrangement, a first spring centers the spool, then a second spring comes into play at a certain point, such as just before the beginning of the modulating function.

The above described pilot valve is operatively connected in the illustrated embodiment to control or operate a main control valve 72. The pilot valve is operatively connected by means of pilot lines 74 and 76 to pressure chambers 78 and 80 where pressure is applied to the end of a control spool 82 to move it to selected control positions. The valve 82 may be of any suitable type, such as that illustrated, wherein it has a central neutral position and is operative upon movement to either side of neutral position to supply pressurized fluid for the operation of a double acting motor in its two respective directions. This main control valve typically has the conventional means of modulation of the control fluid. The valve spool will also typically have the usual dead band to provide proper seal of the valve stem. Dead band may be defined as that movement of the stem which must occur before any valving action occurs.

OPERATION

Figure 2:
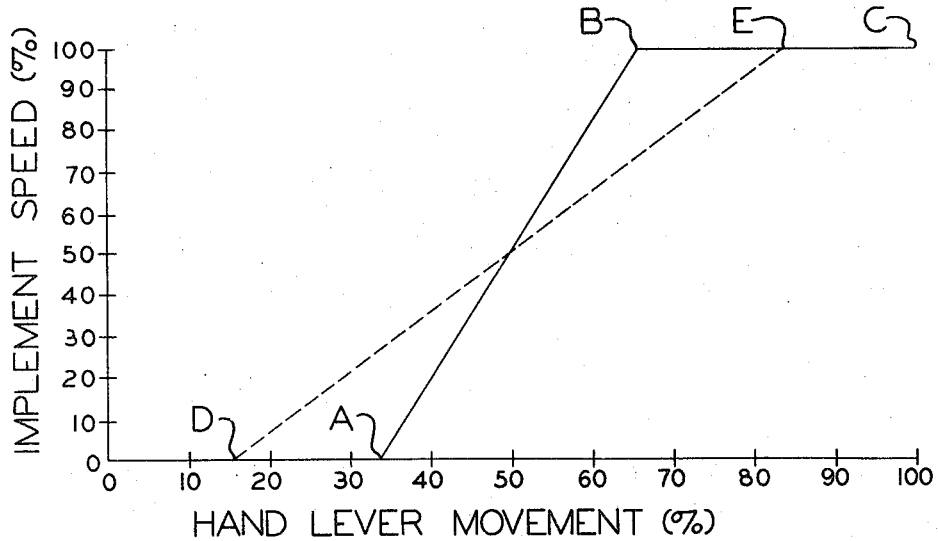
FIG. 2 is a graphic illustration of implement speed plotted against control movement.
Figure 3:
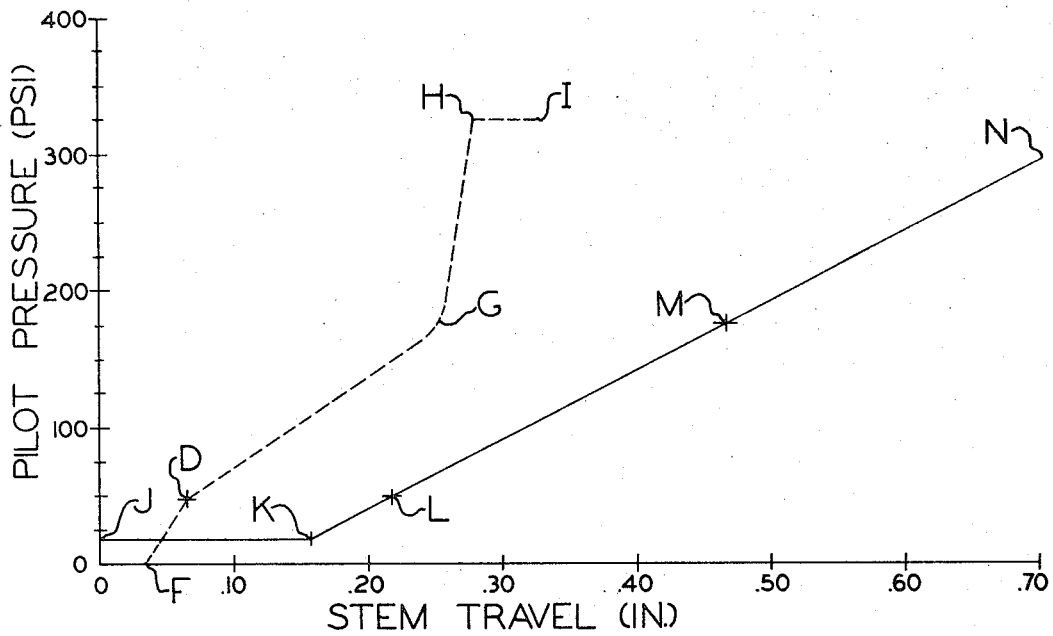
FIG. 3 is a graphic illustration of pilot pressure plotted against stem travel.

The operation of the pilot valve of the present invention can best be understood with reference to the graphs of FIG. 2 and FIG. 3, which also indicate important objects and advantages of the present invention.

Referring to FIG. 2, there is illustrated graphically the percentage of hand lever movement generally required with a conventional valve spool (solid line) in which modulation occurs for approximately only the center one third of its travel range, which also corresponds with full percentage range of implement speed. As indicated by the solid line, the conventional valve must be moved from zero up to approximately 33 percent (point A) of its total movement before any implement movement begins. The modulation range then, extends from 33 percent where implement speed begins, up to approximately 66 percent (point B) of lever movement where implement speed reaches 100 percent. Movement from this point to 100 percent (point C) covers dead band movement which is generally necessary to completely clear the passage across the spool for fully unobstructed flow.

The use of a pilot control valve is illustrated by the dashed line wherein it is indicated that the front end dead band movement extends only up to approximately 15 percent to 18 percent (point D) with modulation beginning at this point and running to the vicinity of 80 percent to 85 percent (point E) of the total movement. Thus, the use of the pilot valve in accordance with the present invention has the advantage of reducing the dead band movement of the control lever, while at the same time, extending the modulation range to the vicinity of 65 percent of the lever movement.

Referring now to FIG. 3, there is an illustration of the travel for the pilot spool as compared to the travel of the control spool, both plotted against pilot pressure. Here again the multiplication of the movement of the control spool by means of the pilot spool is graphically demonstrated. A comparison of these two graphs dramatically illustrates the advantages of a pilot system in accordance with the present invention. Corresponding points on the two graphs are indicated by the same letter.

The cross slots 50 and 52 (FIG. 1) in the stem communicate by way of the fixed orifices 46 and 48 with grooves 32, 34 to supply pilot pump pressure to passages 28, 30 as the stem is moved away from neutral. The cross slot permits an almost instantaneous effectiveness of the fixed orifices with a very small movement of stem travel such as 0.031 inches in the illustrated embodiment. The restriction created by the second orifice 58 and 60 as related to the instant effective total area of the first orifice establishes the pilot pressure. The two orifices in series makes possible a precise control of the pilot pressure, allowing a high pilot pressure rise rate from the time the cross slot 50 and 52 begins to open (point F) until this orifice is fully open (point D). This primary input restriction raises the pilot pressure along the dotted line point F to point D (FIG. 3), resulting in sufficient pilot pressure to move the main control valve from zero to point L where modulation of the main control fluid begins. Point D of FIG. 3 corresponds to the beginning of the pilot valve hand lever modulation range of FIG. 2 at approximately 16 percent of hand lever movement. The pilot pressure rise rate between point D and G is low with respect to hand lever movement for providing a small increment of main spool movement in the modulation range between points L and M. Point M corresponds to the end of pilot valve hand lever modulation range corresponding to point E of FIG. 2. From point G to point H of the pilot stem movement (FIG. 3) the second orifice 58 or 60 (FIG. 1) is closed off. This results in the increase in pressure rise rate from G to maximum pilot system pressure (H) which moves the main spool 82 from M to its maximum extended travel position (N). This high pressure rise rate during this increment of pilot stem movement results in only approximately 16 percent movement of the hand lever corresponding to E to C of FIG. 2 to accomplish the one third dead band movement of the main spool between points M and N.

A more complete understanding of the physical characteristics of the pilot valve can be obtained from the following discussion of the sequence of events occuring as the stems are shifted as the pilot spool moves through the total travel of approximately 0.312 inch corresponding to full displacement. Initial displacement of the pilot spool in either direction from zero to 0.031 inch is dead band necessary to provide sealing and minimizes the pilot system flow requirement and tolerances. The fixed orifice area comprising drilled passages 46 and 48 starts to open at approximately 0.031 inch or point F and is fully effective by approximately the 0.062 inch point D of stem travel at which time pilot line pressure is approximately 40 PSI. Further movement of the pilot stem to 0.07 inch results in a pilot pressure of approximately 50 PSI and the control spool has moved from zero at point J to approximately 0.22 at point L.

As the pilot stem is shifted from approximately 0.07 to 0.250 inches, that is, up to point G, the effective area of the first orifice increases as the variable orifices in the form of slot area 54 or 56 adds to the area of the fixed passage 46 such that pilot pressure increases proportional to stem travel to a maximum of approximately 175 PSI at point G. The increase of pilot pressure between points D and G is at a lower rate than that between points F to D, thus providing an extended and controlled modulation range. The second fixed orifice or passage 58 closes off at approximately 0.250 (point G) of stem travel and pilot pressure then increases at a rapid rate to the maximum system pressure of approximately 325 PSI (point H).

The solid line curve of FIG. 3 indicates the main spool travel for the above described ranges of pilot pressures. The main valve spool, which makes up the actuating portion of this particular control system, has a low rate centering spring that requires only 20 PSI actuator pressure to initiate control spool travel from point J, and 21 PSI to reach 0.156 inch of main spool travel to point K. At this point, the main spool contacts the second or modulating spring. A pilot pressure of approximately 50 PSI is required to compress this high rate modulating spring in conjunction with the centering spring to approximately 0.219 inches at point L of main stem travel which is the beginning of the modulating range. The pilot valve provides this pressure at approximately 0.07 inch of pilot stem travel point D which is considerably less than one third of its 0.312 inch total travel range. The main control valve spool requires 175 PSI actuating pressure to reach 0.469 inch of travel at point M which is the end of the modulating range and this pressure is provided at approximately 0.250 inch pilot valve stem travel, as indicated at point G. Shifting of the main control valve spool to 0.688 inch fall displacement indicated at point N requires 275 PSI actuating pressure. Actuating pressure increases rapidly to 325 PSI at point H between 0.250 and 0.31 inch pilot stem travel, indicated at point I, which again is considerably less than one third of the 0.312 inch total travel of the pilot spool.

The relative position of the pilot stem and main control spool, and pilot pressure to move the main spool for a given position, can be determined for any position by simply projecting vertical and horizontal lines between the curves and coordinates of the graph of FIG. 3. As, for example, to determine the travel of the main spool with one tenth of an inch of pilot stem travel, a vertical line is drawn from 0.10 inch on the horizontal axis upward until it contacts the broken curve of the pilot spool. A horizontal line is then projected rightward until it contacts the solid curve line of the main spool. A vertical line is then projected downward to the horizontal axis of the graph where it is determined that the main spool has traveled approximately 0.26 inches for the 0.1 inch travel of the pilot stem. By projecting the horizontal line between the curves to the vertical axis, the amount of pilot pressure to move the main spool 0.26 inch is approximately 70 PSI.

From the above description it can be seen that there is provided a novel pilot control valve arrangement having means for providing a stepped and modulated control for extending modulation range of a main control valve and reducing the dead band range thereof. In accordance with the invention, pilot pressure is rapidly raised to shift the main control valve through ineffective or dead band positions to a point where modulation begins, at which point the pressure rise is extended gradually over a long range of movement of the pilot valve to provide an extended range of modulation control for the main valve spool. Beyond the modulation range, pilot pressure is again rapidly raised to shift the main control valve rapidly to its fully opened position.

While the present invention is illustrated with respect to a specific embodiment, it is to be understood that numerous changes and modifications may be made in the construction and arrangement of parts of the present invention without departing from the spirit and scope thereof, as defined in the appended claims.

What is claimed is:

1. A pilot control valve, said valve comprising:
   a housing;
   a cylindrical bore formed in said housing;
   inlet and return passages communicating with said bore;
   a pilot control passage communicating with said bore;
   a valve spool reciprocally mounted in said bore and operative in a neutral position to block communications between said passages and operative upon movement from said neutral position to provide communications between said passages; and
   modulating means carried by said spool and operative to provide stepped differential pressure changes in the communication of fluid from the inlet passage to said pilot control passage,
   said modulating means comprising a first fixed passage and a cross slot formed in said valve spool for providing substantially instantaneous full communication with said fixed passage upon movement of said valve spool from said neutral position, and
   a variable area slot formed in said spool and operative to provide variable communication in parallel with said first fixed passage between said inlet and said pilot control passage upon continued movement of said valve spool from said neutral position.

2. The invention of claim 1 comprising a second fixed passage in series with said first fixed passage communicating said pilot control passage with said return passage for reducing the pressure in said pilot control passage to a value below the pressure in said inlet passage.

3. A pilot control valve, said valve comprising:
   a housing;
   a cylindrical bore formed in said housing;
   inlet and return passages communicating with said bore;
   a pilot control passage communicating with said bore;
   a valve spool reciprocally mounted in said bore and operative to control communications between said passages; and
   modulating means carried by spool and operative to differential pressure changes in said pilot control passage,
   said modulating means comprising a first fixed passage operative upon initial movememt of said valve spool from a neutral position to communicate said pilot pressure to said pilot control passage;
   a variable orifice operative in parallel with said first passage to increase the area of communication of said pilot pressure upon further movement of said spool; and
   a second passage operative in series with said first passage to reduce said pilot pressure below the pressure of the source of said pilot pressure.

4. The invention of claim 3 wherein said inlet passage communicates with said bore centrally thereof;
   a return passage communicates with said bore at either side of said inlet passage;
   a pilot control line communicates with said bore between said inlet passage and each of said return passages; and,
   said spool includes a centrally located land and a pair of annular grooves formed on each side of said land for controlling communications between said passages.

5. The invention of claim 4 wherein:
   said first fixed passage is operative to provide substantially instantaneous communication between said inlet and one of said pilot control passages upon initial movement of said spool in either direction from said neutral position;
   said variable area orifice comprising a slot extending from said land to said annular groove operative in parallel with said first passage to provide increased communication between said inlet and said control passage upon further movement of spool; and
   said second passage is operative to provide communication between said pilot control passage and said return passage.

6. The invention of claim 5 comprising a cross slot formed in said land to provide said instantaneous communication; and,
   means to render said second passage ineffective when said annular groove becomes fully effective.

* * * * *

Disclaimer 3,862,645.—*Donald L. Bianchetta*, Coal City, and *Kenneth R. Lohbauer*, Joliet, Ill. PILOT CONTROL VALVE. Patent dated Jan. 28, 1975. Disclaimer filed Feb. 13, 1978, by the assignee, *Caterpillar Tractor Co.*
Hereby enters this disclaimer to claims 3 and 4 of said patent.
[*Official Gazette April 18, 1978.*]